(12) United States Patent
Iijima (10) Patent No.: US 8,851,661 B2
(45) Date of Patent: Oct. 7, 2014

(54) IMAGE RECORDING APPARATUS

(75) Inventor: Shota Iijima, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 140 days.

(21) Appl. No.: 13/429,428

(22) Filed: Mar. 25, 2012

(65) Prior Publication Data

US 2013/0083146 A1   Apr. 4, 2013

(30) Foreign Application Priority Data

Sep. 30, 2011  (JP) ................................. 2011-218295

(51) Int. Cl.
*B41J 11/00* (2006.01)
*H04N 1/00* (2006.01)
*B65H 85/00* (2006.01)
*B65H 29/58* (2006.01)

(52) U.S. Cl.
CPC ............. *B65H 29/58* (2013.01); *H04N 1/0058* (2013.01); *B65H 2404/23* (2013.01); *H04N 1/0062* (2013.01); *H04N 1/00631* (2013.01); *H04N 1/00612* (2013.01); *B65H 2404/513* (2013.01); *B65H 2404/611* (2013.01); *B65H 85/00* (2013.01); *H04N 1/00615* (2013.01); *B65H 2801/06* (2013.01); *H04N 1/00578* (2013.01); *H04N 1/00602* (2013.01); *B65H 2402/46* (2013.01)
USPC ........................................................ 347/104

(58) Field of Classification Search
USPC ........................................................ 347/104
See application file for complete search history.

(56) References Cited

U.S. PATENT DOCUMENTS

| 2002/0051665 | A1 | 5/2002 | Seto et al. |
| 2008/0296834 | A1 | 12/2008 | Matsubara et al. |
| 2009/0085948 | A1* | 4/2009 | Kawamata et al. ............. 347/16 |
| 2010/0207321 | A1 | 8/2010 | Samoto et al. |

FOREIGN PATENT DOCUMENTS

| JP | H04-041361 A | 2/1992 |
| JP | H04-129959 A | 4/1992 |
| JP | H10-218455 A | 8/1998 |
| JP | 2002-205861 A | 7/2002 |
| JP | 2008-297085 A | 12/2008 |
| JP | 2009-173412 A | 8/2009 |
| JP | 2010-208853 A | 9/2010 |

* cited by examiner

*Primary Examiner* — Laura Martin
(74) *Attorney, Agent, or Firm* — Baker Botts L.L.P.

(57) ABSTRACT

There is provided an image recording apparatus including: a platen provided on a lower side of a first transporting path; a recording portion facing the platen; a contacting member contacts on the sheet; a transporting roller; a flap having a first surface defining the first transporting path and a second surface defining a second transporting path; a sandwiching member; and a biasing member biasing the flap toward the sandwiching member. The flap is turnable to be in a first position capable of guiding the sheet in the first transporting path and in a second position blocking the first transporting path. A lower end of the sandwiching member is positioned higher than a lower end of the contacting member.

5 Claims, 10 Drawing Sheets

IMAGE RECORDING APPARATUS

CROSS REFERENCE TO RELATED APPLICATION

The present application claims priority from Japanese Patent Application No. 2011-218295, filed on Sep. 30, 2011, the disclosure of which is incorporated herein by reference in its entirety.

BACKGROUND OF THE INVENTION

1. Field of the Invention

The present invention relates to an image recording apparatus recording an image on a sheet, and particularly to an image recording apparatus capable of recording images on both surfaces of a sheet.

2. Description of the Related Art

Conventionally, there has been known an image recording apparatus capable of recording images on both surfaces of a sheet. In such an image recording apparatus, not only a main transporting path through which a sheet is transported from a tray on which sheets are placed to a discharge port through a recording portion that records an image on a sheet, but also a resupply transporting path is formed. The resupply transporting path is a transporting path through which the sheet having had an image recorded on a front surface thereof by the recording portion and having been transported to a downstream side of the recording portion is transported again to an upstream side of the recording portion in the main transporting path. The sheet having been transported through the resupply transporting path reaches the recording part in a state where a rear surface thereof faces the recording portion. Thereby, the recording portion can record an image on the rear surface of the sheet.

In the image recording apparatus as described above, the sheet having had an image recorded only on the front surface but having had no image recorded on the rear surface is required to be transported to the resupply transporting path. On the other hand, the sheet of which the image recording on the front and rear surfaces has been completed is required to be transported not to the resupply transporting path but to the discharge port to then be discharged from the apparatus. That is, in the image recording apparatus as described above, a path switching portion that switches a transporting destination of the image-recorded sheet is required to be provided.

As one example of the above-described path switching portion, there has been known an image recording apparatus having a tamable or pivotable flap provided therein. In such an image recording apparatus, in the main transporting path, a branch port is formed, and the resupply transporting path extends obliquely downward from the branch port. On an upstream side from the branch port in the main transporting path, the flap is turnably supported. The flap is pressed by a sheet being transported along the main transporting path to thereby be turned upward. Thereafter, when a rear end of the sheet reaches an upper portion of the branch port, the flap turns downward. When a discharge roller reversely rotates in the above state, the sheet is thereby transported to the resupply transporting path. On the other hand, when the discharge roller does not reversely rotate in the above state, the sheet is thereby discharged from the apparatus.

In the case when an image is recorded on a sheet in the image recording apparatus, when front and rear, right and left, and height positions of the sheet deviate while an image is recording, there is increased a possibility that quality of the image recorded on the sheet deteriorates. Thus, the sheet is desirably pressed against a platen. Here, the platen is disposed below a recording portion to face the recording portion, and is a plate-shaped member supporting the sheet on which an image is recorded by the recording portion. When the sheet is pressed against the platen, the front and rear, right and left, and height positions of the sheet on which an image is recording are thereby stabilized.

However, as is the above-described, image recording apparatus, in the structure in which the turnable flap is disposed on an upper side of the transporting path, the flap provides a downward force to the sheet on a downstream side of the platen. Thereby, the upstream portion of the sheet, which is located at upstream side of a position at which the downward force is provided, is likely to rise. In other words, the portion of the sheet, supported on the platen is likely to rise. Thus, a further improvement of the structure in the vicinity of the flap is required in order to press the sheet against the platen.

SUMMARY OF THE INVENTION

The present teaching has been made in view of the above problems, and has an object to provide a structure of pressing a sheet against a platen, thereby being capable of decreasing deterioration of quality of an image recorded on the sheet in an apparatus capable of recording images on both surfaces of a sheet.

According an aspect of the present teaching, there is provided an image recording apparatus which records an image on a sheet, including:

a platen which is provided on a lower side of a first transporting path through which the sheet is guided along a transporting direction, and which supports the sheet guided through the first transporting path;

a recording portion which is provided on an upper side of the first transporting path to face the platen, and which records the image on the recording surface of the sheet supported on the platen;

a contacting member which is disposed on the upper side of the first transporting path at a downstream side from the recording portion in the transporting direction, and which is configured to contact on the sheet at a position that is lower than a lower surface of the recording portion and higher than an upper surface of the platen;

a transporting roller which is disposed at the downstream side from the contacting member in the transporting direction to transport the sheet;

a flap which is configured to turn on a shaft, of which a tip portion is positioned between the contacting member and the transporting roller in the transporting direction, and which includes a first surface and a second surface, a sandwiching member which is disposed on the upper side of the first transporting path and which is configured to sandwich the sheet between the sandwiching member and the flap; and a biasing member which is configured to bias the flap toward a side of the sandwiching member, wherein the first surface of the flap forms a lower side guide surface of the first transporting path, the second surface of the flap forms an upper side guide surface of a second transporting path, the second transporting path is a transporting path which extends below the platen, through which the sheet is guided, and which is connected to the first transporting path between the contacting member and the transporting roller in the transporting direction, and an upstream side from the recording portion in the transporting direction, the flap is configured to turn to be in a first position in which the flap sandwiches the sheet between the flap and the sandwiching member to guide the sheet in the first transporting path, and in a second position in which the tip portion is positioned higher than the tip portion in the first position to block the first transporting path, and a lower end of the sandwiching member is positioned higher than a lower end of the contacting member.

When the sheet is conveyed through the upstream side from the flap in the transporting direction, the flap is biased by the biasing members to take the second position. When the sheet reaches the flap to be supported on the flap, the flap is pressed downward by the weight of the sheet to turn from the second position to the first position. Thereby, the sheet having had an image recorded on a front surface thereof by the recording portion and then having had reached the flap is conveyed through the first transporting path in the transporting direction while being sandwiched by the flap and the sandwiching member. Thereafter, a tip of the sheet in the transporting direction is brought into a state of being transported by the transporting roller positioned on the downstream side of the flap (for example, a state of being sandwiched by the transporting roller and a driven roller disposed to face the transporting roller). Thereafter, the sheet is conveyed by the transporting roller. Next, when a rear end of the sheet in the transporting direction has passed through the flap, the flap is biased again by the biasing members to turn from the first position to the second position. In the above state, the transporting roller reversely rotates, and thereby the sheet is transported to a reverse transporting path while being guided by the second surface of the flap. Incidentally, the flap in the second position blocks the first transporting path, so that the sheet is not reversely transported through the first transporting path by the reverse rotation of the transporting roller. The sheet having been transported through the reverse transporting path is transported through the first transporting path again to reach the recording portion. At this time, a rear surface of the sheet faces the recording portion. Thus, the recording portion can record an image on the rear surface of the sheet. From the above, in this constitution, double-sided image recording on the sheet is made possible.

The turned tip portion of the above-described flap is biased toward the side of the sandwiching member by the biasing members. The sheet being guided through the first transporting path along the transporting direction abuts on the first surface of the flap. Thereby, the flap is pressed downward by the weight of the sheet to change its position from the second position to the first position. In the above state, the sheet is conveyed in the transporting direction while being supported on the first surface, and reaches the position of the sandwiching member. Consequently, the sheet is brought into a state of being sandwiched by the sandwiching member and the flap. In the above state, to the sandwiched portion of the sheet, an upward force is provided by the biasing members.

Further, on the upstream side from the sandwiching member capable of sandwiching the sheet with the turned tip portion of the flap in the transporting direction, the contacting member is provided. The contacting member abuts or contacts on the sheet from above. Then, the lower end of the sandwiching member is positioned higher than the lower end of the contacting member. Accordingly, (i) the sheet is brought into a state of being inclined upward with respect to the transporting direction on the downstream side from the platen in the transporting direction. Further, (ii) as described above, the sheet has an upward force provided thereto by the biasing members at the most downstream position of the inclination, namely at the sandwiching position by the sandwiching member and the flap. According to (i) and (ii) described above, the sheet is pressed against the platen.

BRIEF DESCRIPTION OF THE DRAWINGS

FIG. 5A and FIG. 5B are views each showing the flap 41 in the second position and an upper side guide member 82 having a second spur 63 attached thereto, wherein FIG. 5A shows a front view, and FIG. 5B shows a cross-sectional view taken along VB-VB in FIG. 5A;

FIG. 6A and FIG. 6B are views each showing the flap 41 in the first position and the upper side guide member 82 having the second spur 63 attached thereto, wherein FIG. 6A shows a front view, and FIG. 6B shows a cross-sectional view taken along VIB-VIB in FIG. 6A;

FIG. 7A and FIG. 7B are views each showing the flap 41 in the second position and the upper side guide member 82 to which the second spur 63 is not attached, wherein FIG. 7A shows a front view, and FIG. 7B shows a cross-sectional view taken along VIIB-VIIB in FIG. 7A;

FIG. 8A and FIG. 8B are views each showing the flap 41 in the first position and the upper side guide member 82 to which the second spur 63 is not attached, wherein FIG. 8A shows a front view, and FIG. 8B shows a cross-sectional view taken along in FIG. 8A;

FIG. 10A and FIG. 10B are vertical cross-sectional views each schematically showing a structure of the vicinity of the flap 41 in the printer portion 11, wherein FIG. 10A shows the case of a first modified embodiment, and FIG. 10B shows the case of a third modified embodiment.

DETAILED DESCRIPTION OF THE PREFERRED EMBODIMENTS

Hereinafter, an embodiment of the present teaching will be explained. It should be noted that the embodiment explained below is only an example of the present teaching, and it goes without saying that the embodiment can be appropriately modified within a range not changing the spirit of the present teaching. Further, in the following explanation, an up and down direction 7 is defined based on a state where a multifunction apparatus 10 is placed so that it can be used (the state in FIG. 1), and a front and rear direction 8 is defined by taking a side where an opening 13 is provided as a near side (the front), and a right and left direction 9 is defined when the multifunction machine 10 is seen from the near side (the front).

<Multifunction Apparatus 10>

Figure 1:
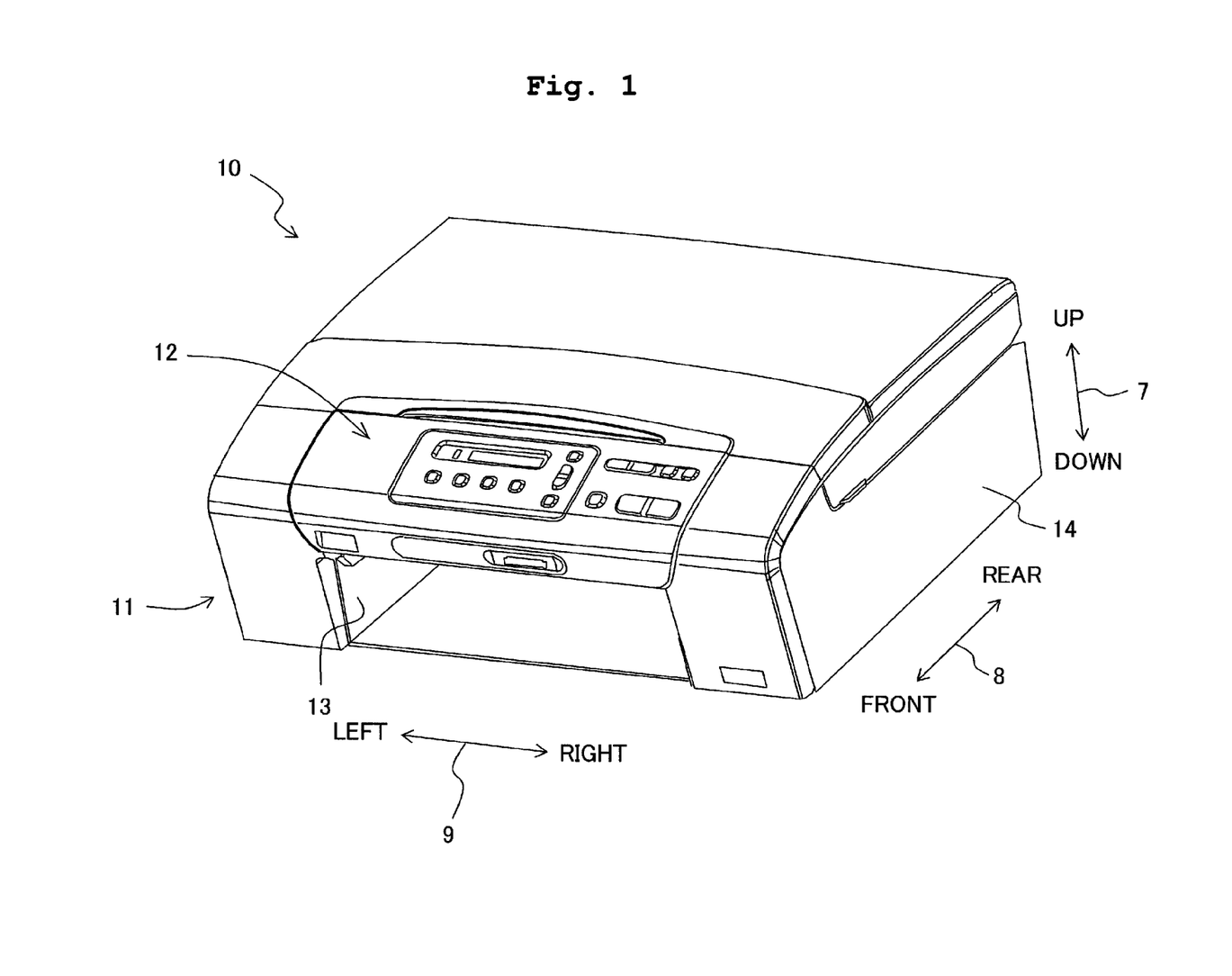
FIG. 1 is an external perspective view of a multifunction apparatus 10.

As shown in FIG. 1, the multifunction apparatus 10 has substantially a thin rectangular parallelepiped shape. The multifunction apparatus 10 has various functions of a facsimile function, a printing function, and so on. As the printing function, a double-sided image recording function of recording images on both surfaces of a recording paper is provided. Note that whether or not the functions other than the printing function are provided is optional. Further, the multifunction apparatus 10 has a printer portion 11 that records an image on a recording paper 16 (refer to FIG. 2) provided in a lower portion of the multifunction apparatus 10. The printer portion 11 has a casing 14 having the opening 13 formed in the front thereof, and in the printer portion 11, a paper feeding tray 20 on which the recording papers 16 in various sizes can be placed (refer to FIG. 2) is provided so as to be insertable/removal into/from the opening 13 in the front and rear direction 8.

Figure 2:
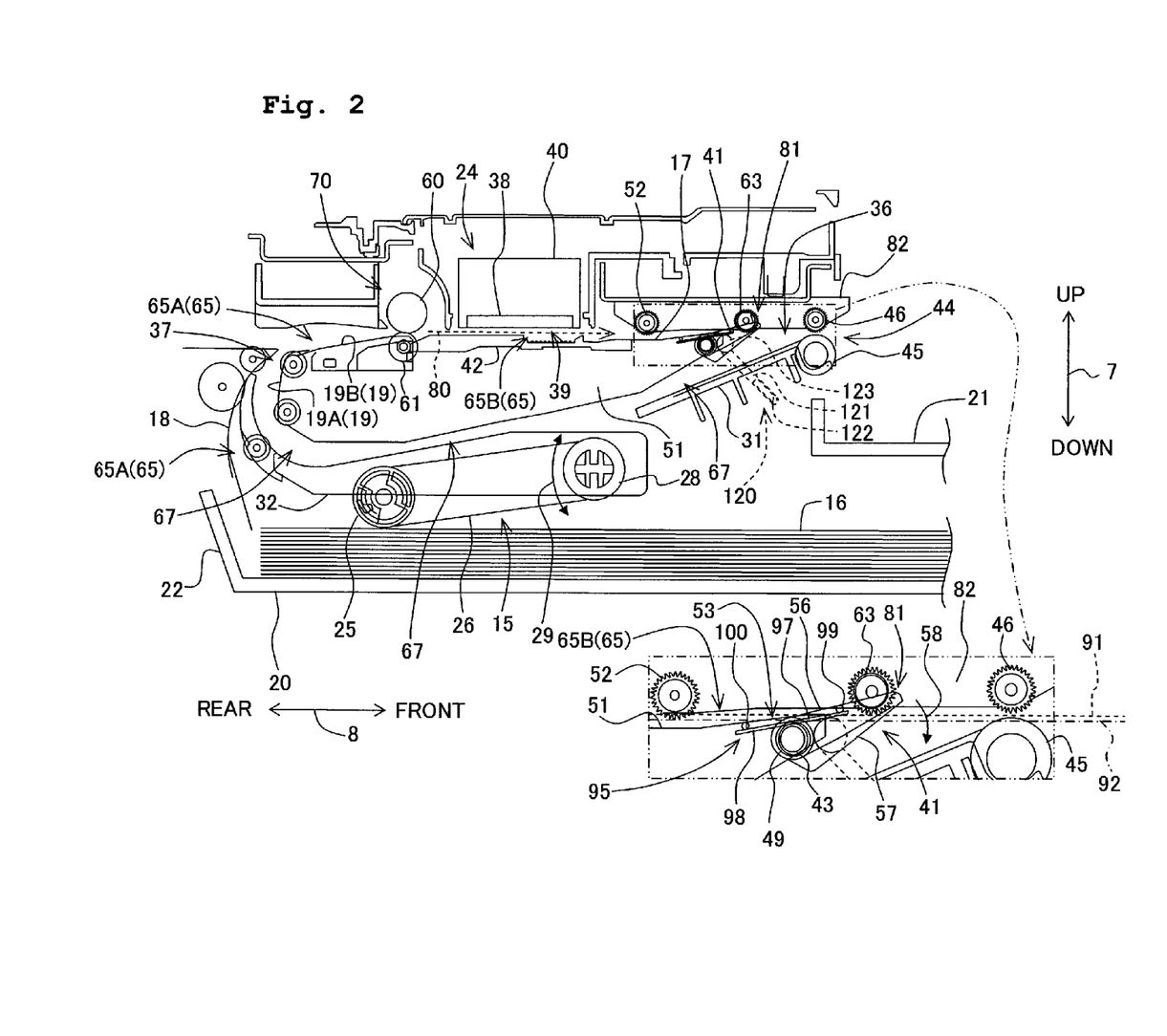
FIG. 2 is a vertical cross-sectional view schematically showing an internal structure of a printer portion 11, and shows a state where a flap 41 is in a second position.

As shown in FIG. 2, the printer portion 11 includes: a paper feeding portion 15 that picks up the recording paper 16 from the paper feeding tray 20 to feed it; a recording portion 24 of an ink-jet recoding method that is provided above the paper feeding tray 20 and records an image on the recording paper 16 by jetting ink droplets onto the recording paper 16 fed by the paper feeding portion 15; a flap 41; and so on. Note that the recording portion 24 is not limited to the ink-jet recoding method, and various recoding methods such as an electrophotographic method are applicable.

<Paper Feeding Portion 15>

As shown in FIG. 2, the paper feeding portion 15 is provided above the paper feeding tray 20. The paper feeding portion 15 includes: a paper feeding roller 25; a paper feeding arm 26; and a drive transmitting mechanism (not illustrated). The paper feeding roller 25 is pivotally supported to a front end portion of the paper feeding arm 26. The paper feeding arm 26 turns in the directions of arrows 29 on a shaft 28. Thereby, the paper feeding roller 25 can come into contact with/separate from the paper feeding tray 20. A driving force of a paper feeding motor 101 (refer to FIG. 9) is transmitted to the paper feeding roller 25, by the drive transmitting mechanism that is provided inside the paper feeding arm 26 and in which a plurality of gears are engaged, and thereby the paper feeding roller 25 rotates. The paper feeding roller 25 separates the recording papers 16 placed on the paper feeding tray 20 one by one, to supply the recording paper 16 to a curved path 65A.

<Transporting Path 65>

As shown in FIG. 2, inside the printer portion 11, a transporting path 65 extending from a tip (an end portion on the rear side) of the paper feeding tray 20 to a paper discharge tray 21 through the recording portion 24 is formed. The transporting path 65 is divided into the curved path 65A and a linear path 65B.

The curved path 65A is a curved passage extending from the vicinity of an upper end of a separation inclined plate 22 provided on the paper feeding tray 20 to a transporting roller pair 70. The curved path 65A is substantially formed into an arc shape based on the internal portion side of the printer portion 1 as the center. The recording paper fed from the paper feeding tray 20 is transported Mona the curved path 65A to be guided to the transporting roller pair 70. The curved path 65A is demarcated or defined by an outer side guide member 18 and a later-described rear surface 19 of a module main body 51 that face each other with a predetermined space therebetween.

The linear path 65B is a linear passage extending from the transporting roller pair 70 to the paper discharge tray 21. The linear path 65B, at the region where the recording portion 24 is provided, is formed by the recording portion 24 and a platen 42 that face each other with a predetermined space therebetween. The recording portion 24 is disposed on an upper side of the linear path 65B, and the platen 42 is disposed on a lower side of the linear path 65B. Further, the linear path 65B, at the region where the recording part 24 is not provided, is defined by an upper side guide member 82 and an upper surface 17 of the module main body 51 that face each other with a predetermined space therebetween. Incidentally, the upper surface 17 is, of an upper side surface of the module main body 51, a surface at the front of the transporting roller pair 70. On the other hand, the above-described rear surface 19 is a surface formed by a surface 19A of a rear end portion of the module main body 51 and a surface 19B inclined rearward from the transporting roller pair 70.

The upper side guide member 82 is provided on the upper side of the linear path 65B. Further, as shown in FIG. 5A and FIG. 5B and FIG. 6A and FIG. 6B, on a lower surface of the upper side guide member 82, a plurality of recessed portions 83 are formed in the right and left direction 9. The recessed portions 83 are provided to face the flap 41. Further, as will be described later, the flap 41 turns and a tip portion 81 of the turned flap 41 is inserted into the recessed portions 83 (refer to FIG. 5A and FIG. 5B). Here, the tip portion 81 corresponds to a turned tip of the flap 41 and the vicinity of the turned tip. From the above, the upper side guide member 82 is provided on the upper side of the linear path 65B to face the tip portion 81 of the flap 41, and has the recessed portions 83 formed on a linear path 65B side thereof.

As shown in FIG. 2, the recording paper 16 is guided along a first transporting direction 80 going through the linear path 65B from the rear side to the front side (the direction indicated by a broken arrow in FIG. 2). When the recording paper 16 guided through the linear path 65B is supported by the platen 42 from below, an upper surface of the recording paper 16 faces the recording part 24. On the upper surface, an image is recorded by the recording portion 24. That is, through the linear path 65B, the recording paper 16 is guided along the first transporting direction with a recording surface facing upward.

<Module Main Body 51 and Platen 42>

As shown in FIG. 2, inside the printer portion 11, the module main body 51 is disposed. The module main body 51 is disposed between the recording portion 24 and the paper feeding portion 15 in the up and down direction 7. The module main body 51 has both ends thereof in the right and left direction 9 supported by a frame (not illustrated) of the multifunction apparatus 10. The platen 42, a pinch roller 61, the flap 41, and so on are attached to the module main body 51.

The platen 42 is a substantially thin plate-shaped member attached to the upper surface 17 of the module main body 51 from above. The platen 42 is attached to a middle portion of the module main body 51 in the front and rear direction 8. From the above, the platen 42 is provided on the lower side of the linear path 65B. Then, an upper surface of the platen 42 forms a lower side guide surface of the linear path 65B. On the upper surface of the platen 42, the recording paper 16 guided through the linear path 65B is supported.

The pinch roller 61 is attached to the module main body 51 at the rear of the platen 42. The pinch roller 61 will be described later.

The flap 41 is attached to the module main body 51 at the front of the platen 42. The flap 41 will be described later.

The portion, of the upper surface 17 of the module main body 51, between the platen 42 and the flap 41 (particularly, a later-described first surface 56 of the flap 41) in the first transporting direction 80 is an inclined surface 53 of which front side is positioned higher than its rear side (an example of a third surface of the present teaching). The inclined surface 53 is provided on the lower side of the linear path 65B, and forms the lower side guide surface of the linear path 65B. From the above, the portion, of the module main body 51, where the inclined surface 53 is formed is an example of a first guide member of the present teaching.

<Recording Portion 24>

As shown in FIG. 2, the recording portion 24 is provided on the upper side of the linear path 65B to face the platen 42. The recording portion 24 includes a carriage 40 having a recording head 38 mounted thereon and reciprocating in the right and left direction 9 (the direction perpendicular to the paper in FIG. 2). Ink is supplied to the recording head 38 from an ink cartridge (not-illustrated). The recording head 38 jets the ink from nozzles 39 as micro ink droplets. The carriage 40 reciprocates in the right and left direction 9, and thereby the recording head 38 scans the recording paper 16 and an image is recorded on the recording surface of the recording paper 16 guided through the linear path 65B while being supported on the platen 42, namely on the upper surface of the recording paper 16.

<Transporting Roller Pair 70>

As shown in FIG. 2, on an upstream side from the recording portion 24 in the first transporting direction 80, the transporting roller pair 70 consisting of a first transporting roller 60 and the pinch roller 61 is provided. The first transporting roller 60 has both ends thereof in the right and left direction 9 rotatably and pivotally supported to the frame of the multifunction apparatus 10. The pinch roller 61 is disposed under the first transporting roller 60, and has both ends thereof in the right and left direction 9 rotatably supported to the module main body 51. The pinch roller 61 is come into pressure contact with the transporting roller 60 by a not-illustrated resilient member (biasing member) such as a spring.

The first transporting roller 60 has a driving force in a forward or reverse rotation direction transmitted thereto from a transporting motor 102 (refer to FIG. 9) to thereby forwardly rotate or reversely rotate. For example, when a driving force in the forward rotation direction is transmitted to the first transporting roller 60 from the transporting motor 102, the first transporting roller 60 rotates in the direction to transport the recording paper 16 in the first transporting direction 80, and when a driving force in the reverse rotation direction is transmitted to the first transporting roller 60 from the transporting motor 102, the first transporting roller 60 rotates in the direction to transport the recording paper 16 in the direction reverse to the first transporting direction 80. That is, a driving force in the forward rotation direction is transmitted to the transporting roller pair 70 from the transporting motor 102, and thereby the transporting roller pair 70 sandwiches the recording paper 16 transported through the curved path 65A to transport the recording paper 16 onto the platen 42.

<First Spur 52>

As shown in FIG. 2, on a downstream side from the recording portion 24 in the first transporting direction 80, a first spur 52 (an example of an abutting member of the present teaching) is provided. The first spur 52 has both ends thereof in the right and left direction 9 rotatably and pivotally supported to the upper side guide member 82. That is, the first spur 52 is provided on the upper side of the linear path 65B. Thereby, the first spur 52 abuts on the upper surface of the recording paper 16 from above. Note that it is possible to dispose a plurality of the first spurs 52 in line in the right and left direction 9.

A lower end of the first spur 52 is disposed between the recording portion 24 and the platen 42 in the up and down direction 7. Thereby, the first spur 52 abuts on the upper surface of the recording paper 16 at a position lower than the recording portion 24 and higher than the platen 42.

<Discharge Roller Pair 44>

On the downstream side from the recording portion 24 in the first transporting direction 80, particularly, the downstream side from the first spur 52 in the first transporting direction 80, a discharge roller pair 44 consisting of a second transporting roller 45 (an example of a transporting roller of the present teaching) and a spur 46 is provided. The spur 46 is disposed on the second transporting roller 45, and is come into pressure contact with a roller surface of the second transporting roller 45 by a not-illustrated biasing member such as a spring. Thereby, the spur 46 rotates in conjunction with rotation of the second transporting roller 45.

The second transporting roller 45 has a driving force in the forward or reverse rotation direction transmitted thereto from the above-described transporting motor 102 (refer to FIG. 9, an example of a drive source of the present teaching) to thereby forwardly rotate or reversely rotate. Thereby, the second transporting roller 45 transports the recording paper 16. For example, when single-sided recording is performed, the second transporting roller 45 forwardly rotates, and thereby the recording paper 16 is sandwiched by the discharge roller pair 44 to be transported to the downstream side, and then is discharged to the paper discharge tray 21. On the other hand, when double-sided recording is performed, in a state where the discharge roller pair 44 sandwiches a rear end portion of the recording paper 16 in the first transporting direction 80, the rotation direction of the second transporting roller 45 is switched to the reverse rotation from the forward rotation. Thereby, the recording paper 16 is sandwiched by the discharge roller pair 44 to be transported in the direction reverse to the first transporting direction 80, and then the recording paper 16 is guided by the later-described flap 41 to be transported through a reverse transporting path 67 that will be explained below.

<Reverse Transporting Path 67>

As shown in FIG. 2, the reverse transporting path 67 (an example of a second transporting path of the present teaching) is connected to the transporting path 65 at a connecting position 36 and a connecting position 37. Here, the connecting position 36 is positioned between the first spur 52 and the second transporting roller 45 in the transporting path 65 in the first transporting direction 80. Further, the connecting position 37 is positioned on the upstream side from the transporting roller pair 70 in the first transporting direction 80, namely on the upstream side from the recording portion 24 in the first transporting direction 80, in the transporting path 65.

The reverse transporting path 67 extends below the platen 42 and above the paper feeding portion 15. An upper side of the reverse transporting path 67 is defined by a lower surface of the module main body 51. Further, a lower side of the reverse transporting path 67 is defined by a first lower side guide member 31 and a second lower side guide member 32.

The recording paper 16 is transported in the direction reverse to the first transporting direction 80 by the discharge roller pair 44, thereby being transported through the reverse transporting path 67 in the direction from the connecting position 36 to the connecting position 37.

<Flap 41>

As shown in FIG. 2, the flap 41 is attached to the module main body 51. That is, the flap 41 is provided on the lower side of the linear path 65B. The flap 41 will be described in detail below.

Figure 3:
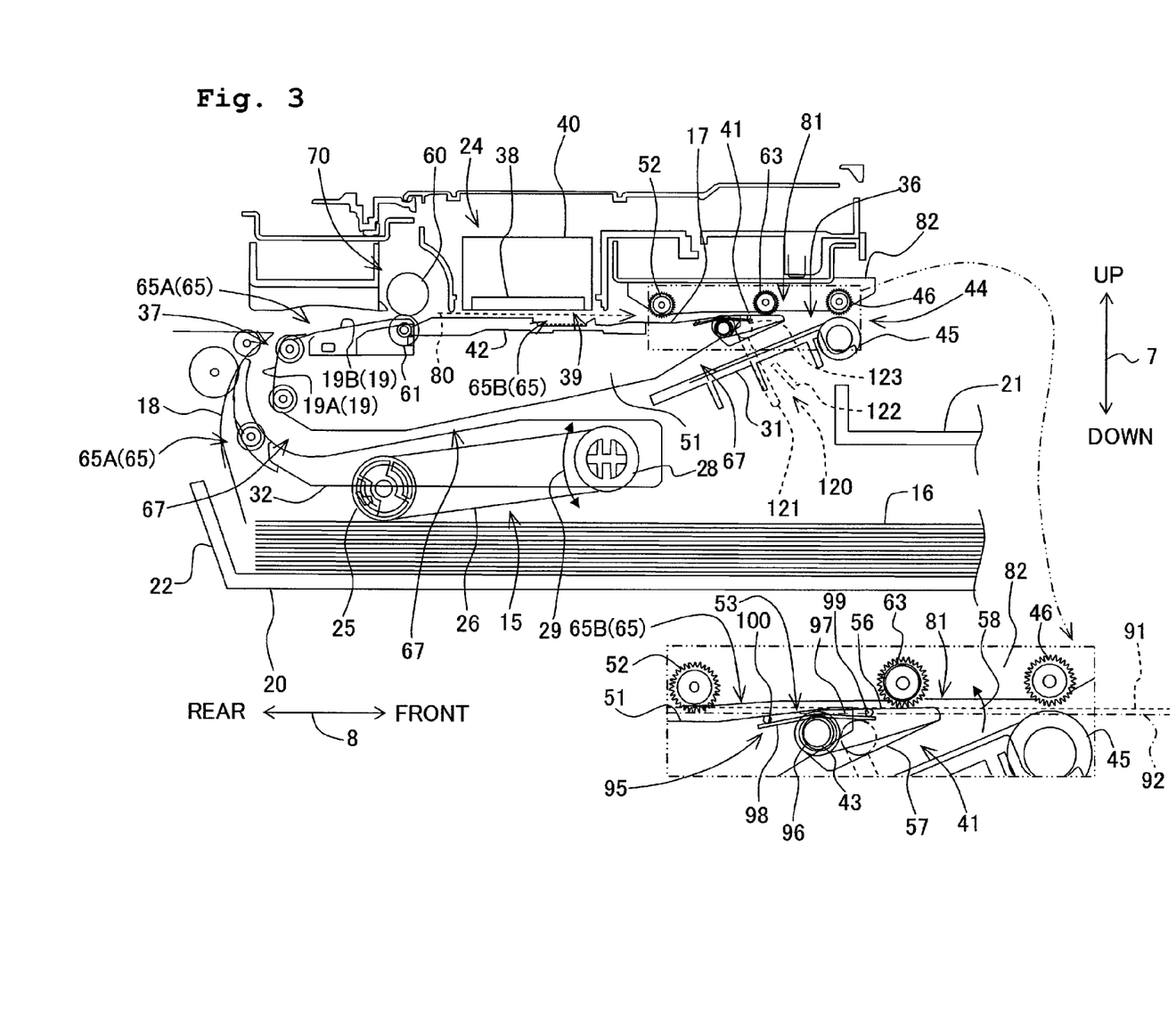
FIG. 3 is a vertical cross-sectional view schematically showing the internal structure of the printer portion 11, and shows a state where the flap 41 is in a first position.
Figure 4:
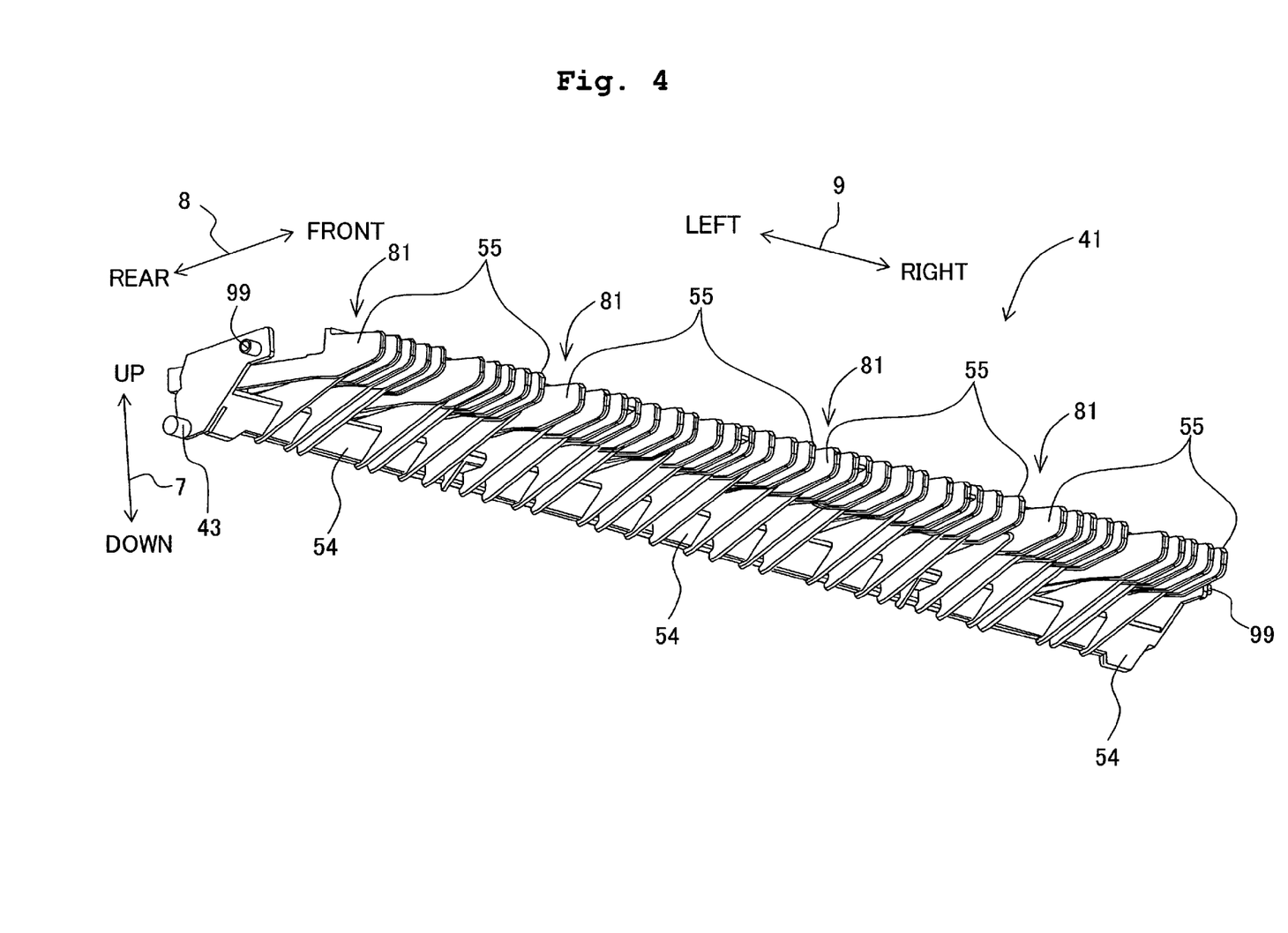
FIG. 4 is an external perspective view of the flap 41.

As shown in FIG. 4, the flap 41 is formed of a main body 54 and a plurality of ribs 55. The main body 54 is a substantially bar-shaped member extending in the right and left direction 9. On both ends of the main body 54 in the right and left direction 9, a projection 43 projecting outward is formed. On the other hand, in the vicinity of a front end of the module main body 51, holes (not-illustrated) are formed. The projections 43 are inserted into the holes. The projections 43 extend in the same direction as shafts of the first transporting roller 60 and the second transporting roller 45, namely in the right and left direction 9. From the above, the flap 41 turns in the direction of an arrow 58 (refer to FIG. 2) and the direction of an arrow 59 (refer to FIG. 3) on the projections 43 as a shaft. That is, the flap 41 is turnably supported to the module main body 51. Note that the turns of the flap 41 will be further explained in detail later.

As shown in FIG. 4, a plurality of the ribs 55 are formed on the main body 54. Particularly, a plurality of the ribs 55 are formed on the main body 54 so as to project forward from the main body 54 attached to the module main body 51. A plurality of the respective ribs 55 are formed at predetermined intervals in the right and left direction 9. Upper surfaces of the respective ribs 55 face the linear path 65B from below, and support the recording paper 16 to be transported through the linear path 65B. Thereby, the upper surfaces of the respective ribs 55 form the lower side guide surface of the linear path 65B as the first surface 56 being an upper surface of the flap 41 (refer to FIG. 2, an example of a first surface of the present teaching). Further, lower surfaces of the respective ribs 55 face the reverse transporting path 67 from above. Thereby, the lower surfaces of the respective ribs 55 form an upper side guide surface of the reverse transporting path 67 as a second surface 57 being a lower surface of the flap 41 (refer to FIG. 2, an example of a second surface of the present teaching).

In this embodiment, the upper surfaces of the respective ribs 55 are formed in parallel with each other. Thereby, in this embodiment, the first surface 56 of the flap 41 formed of the upper surfaces of the respective ribs 55 is a plane. Note that the upper surfaces of the respective ribs 55 do not have to be formed in parallel with each other. For example, the upper surfaces of the respective ribs 55 may also be positioned at heights different from each other.

As shown in FIG. 2, front end portions of the respective ribs 55, namely the tip portion 81 of the flap 41 is disposed on the downstream side from the first spur 52 in the first transporting direction 80 and on the upstream side from the second transporting roller 45 in the first transporting direction 80. In other words, the tip portion 81 of the flap 41 is disposed between the first spur 52 and the second transporting roller 45 in the first transporting direction 80. Further, the tip portion 81 of the flap 41 is disposed at a position facing a later-described second spur 63.

Further, a right end of the flap 41 is to the right of a right end of the recording paper 16 to be transported through the transporting path 65, and a left end of the flap 41 is to the left of a left end of the recording paper 16 to be transported through the transporting path 65. That is, the flap 41 is provided over at least a range where the recording paper 16 to be transported through the transporting path 65 is positioned, in the right and left direction 9.

<Second Spur 63>

As shown in FIG. 2, between the first spur 52 and the discharge roller pair 44, the second spur 63 (an example of a sandwiching member of the present teaching, and corresponding to a spur roller which is an example of the sandwiching member of the present teaching) is provided. The second spur 63 has both ends thereof in the right and left direction 9 rotatably supported to the upper side guide member 82. That is, the second spur 63 is disposed on the upper side of the linear path 65B. Note that it is possible to dispose a plurality of the second spurs 63 in line in the right and left direction 9.

The second spur 63 is disposed to face a front end portion of the flap 41, namely the tip portion 81 of the flap 41. As will be described later, when the flap 41 is in a state where its position has been changed to a first position (in the state shown in FIG. 3), the recording paper 16 is sandwiched between the second spur 63 and the tip portion 81 of the flap 41.

Further, as shown in FIG. 5A and FIG. 5B and FIG. 6A and FIG. 6B, the second spur 63 is provided between the ribs 55 of the flap 41 in the right and left direction 9. In other words, the second spur 63 does not face the ribs 55 of the flap 41.

<Turns of the Flap 41>

Figure 5A:
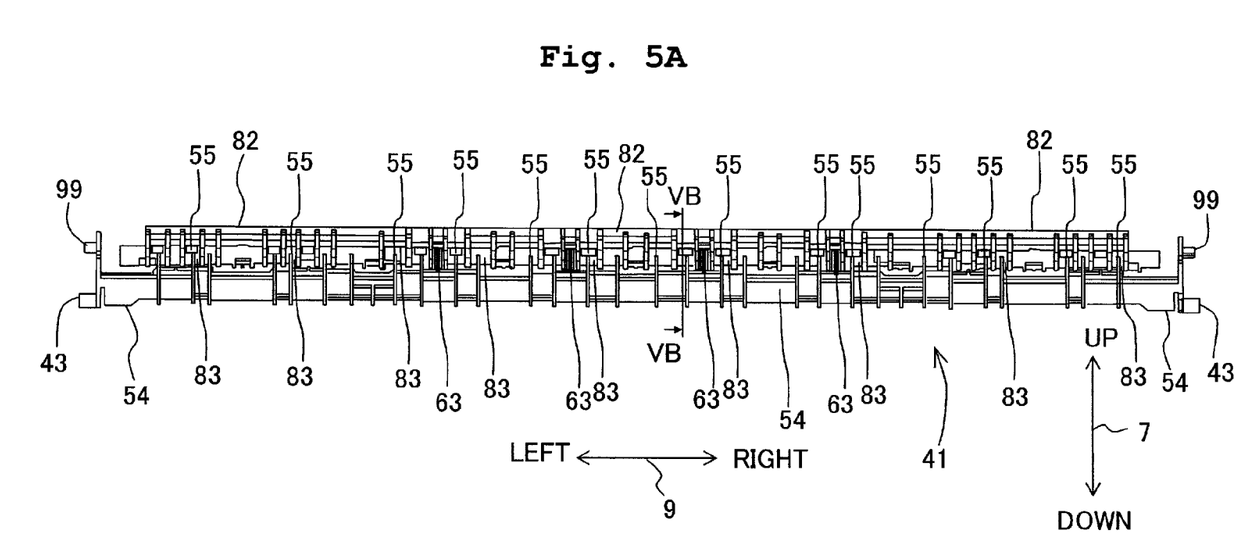
Figure 5B:
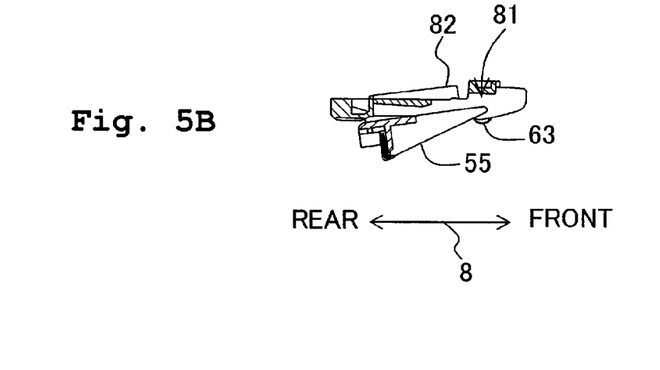
Figure 6A:
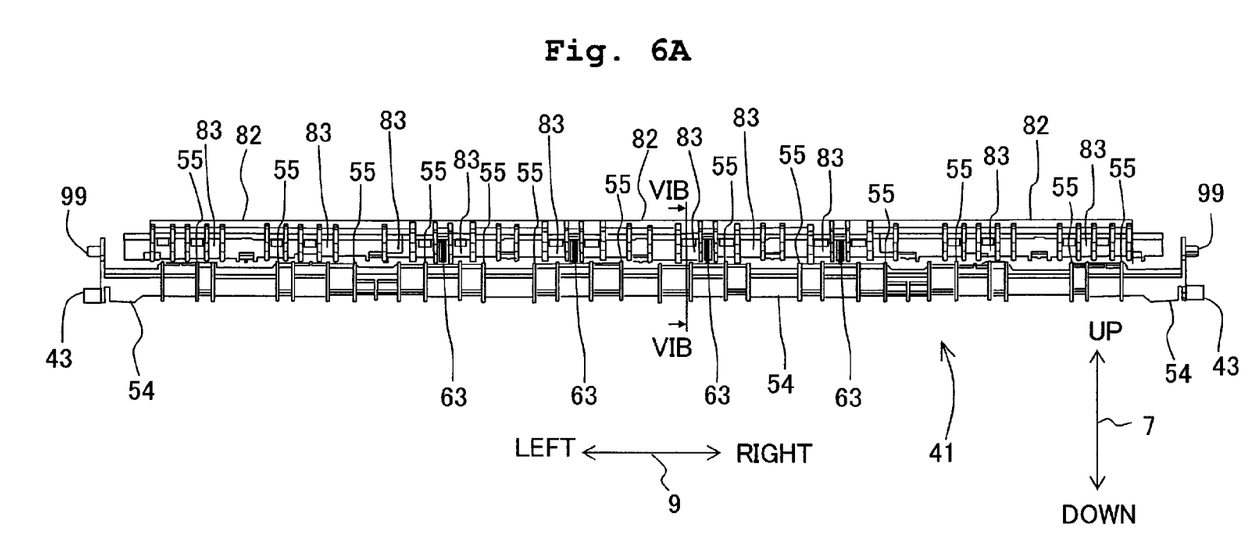
Figure 6B:
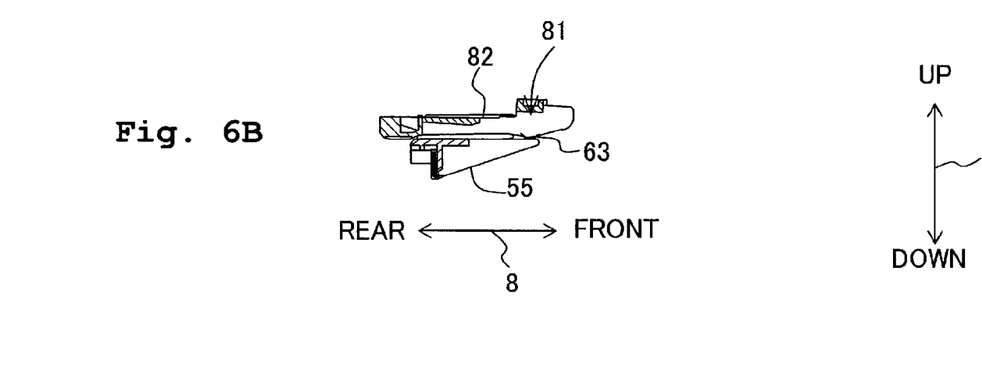
Figure 7A:
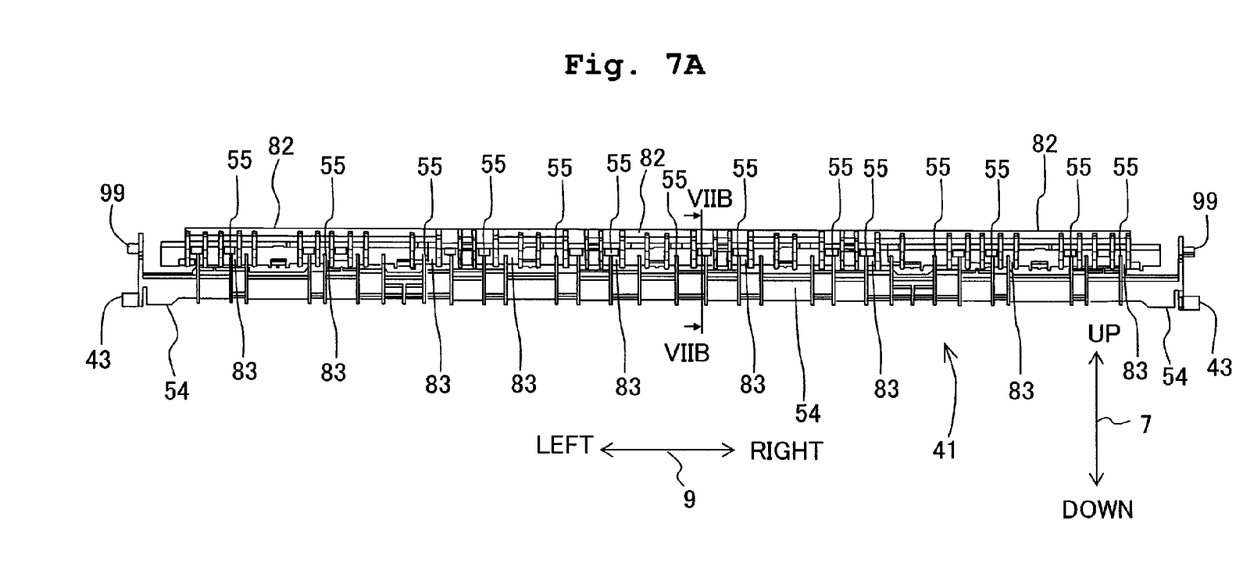
Figure 7B:
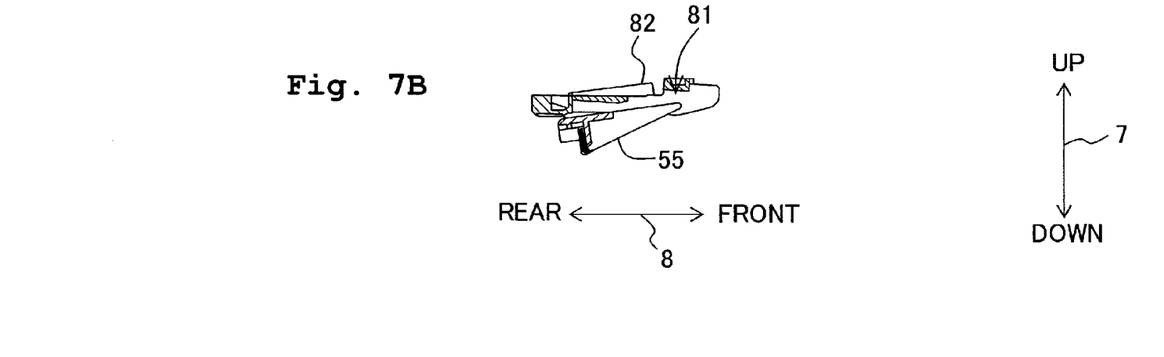
Figure 8A:
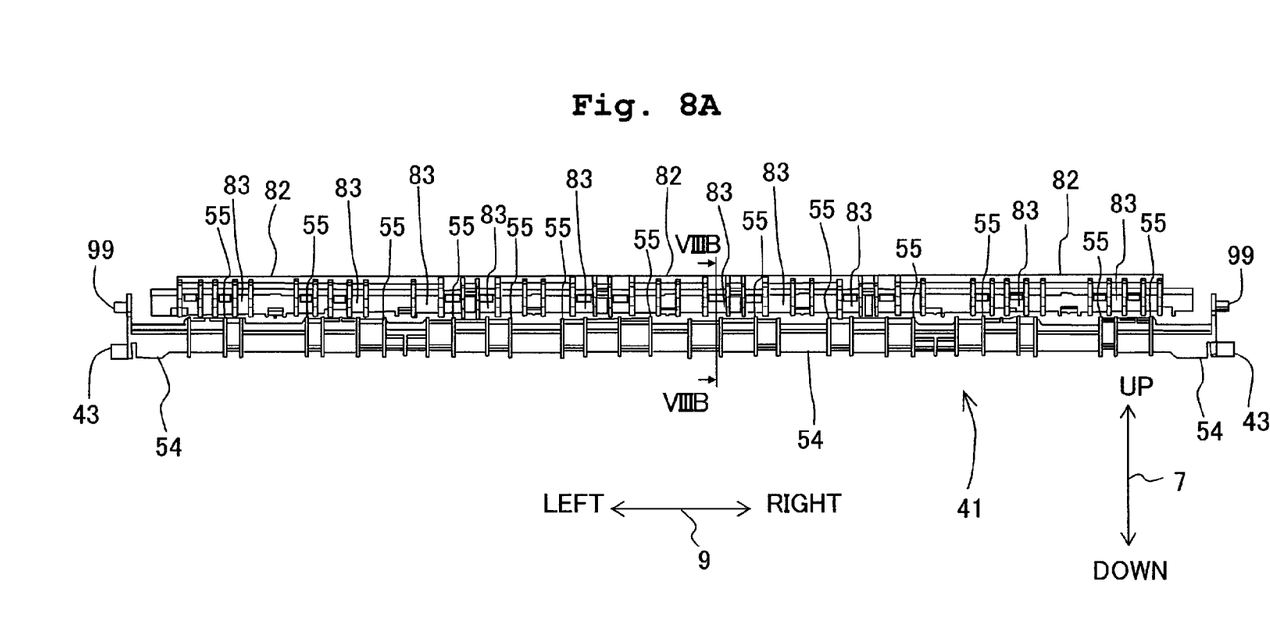
Figure 8B:
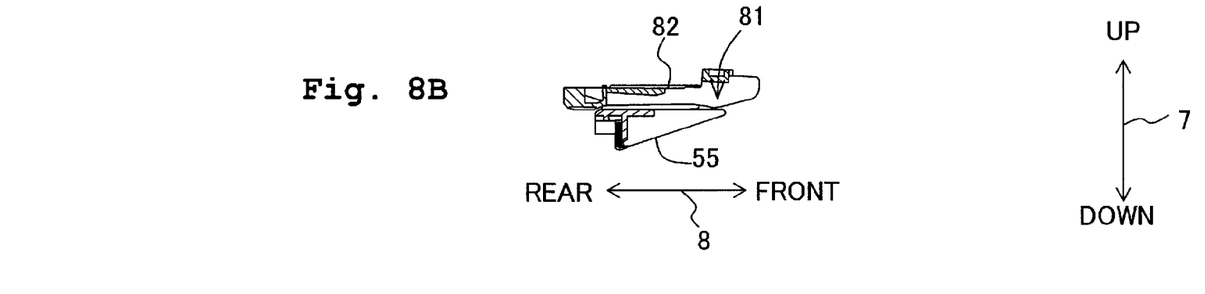

The flap 41 turns between the first position shown in FIG. 3 and FIG. 6A and FIG. 6B and a second position shown in FIG. 2 and FIG. 5A and FIG. 5B.

As shown in FIG. 3 and FIG. 6A and FIG. 6B, in the first position, a height 91 of a lower end of the second spur 63 (indicated by a broken line in FIG. 3) is at almost the same height as the tip portion 81 of the flap 41. Thus, the flap 41 sandwiches the recording paper 16 with the second spur 63. The recording paper 16 being sandwiched is transported through the linear path 65B by at least one of the transporting roller pair 70 and the discharge roller pair 44. That is, the flap 41 guides the recording paper 16 in the transporting path 65.

As shown in FIG. 2 and FIG. 5A and FIG. 5B, in the second position, the tip portion 81 of the flap 41 is positioned higher than when the tip portion 81 of the flap 41 is in the first position, and is inserted into the recessed portions 83 formed in the upper side guide member 82. Thereby, the height of the tip portion 81 of the flap 41 is positioned higher than the height 91 of the lower end of the second spur 63. Consequently, the flap 41 cannot sandwich the recording paper 16 with the second spur 63. That is, the flap 41 in the second position blocks the linear path 65B.

As shown in FIG. 2 and FIG. 3, the height 91 of the lower end of the second spur 63 indicated by the broken line is higher than a height 92 of a lower end of the first spur 52 indicated by a one-dot chain line. That is, the lower end of the second spur 63 is higher than that of the first spur 52.

<Coil Spring 95>

As shown in FIG. 2 and FIG. 3, in this embodiment, coil springs 95 (an example of biasing members of the present teaching) are attached to the flap 41. In this embodiment, torsion spring is used as the coil springs 95. The coil springs 95 each consist of a coil portion 96, a first arm portion 97, and a second arm portion 98.

The coil portions 96 are attached to the projections 43 projecting from the main body 54 of the flap 41 (refer to FIG. 4). Each tip of the first arm portions 97 is conic into pressure contact with a first stopper 99 projecting from the main body 54 of the flap 41 (refer to FIG. 4) in a state of being biased upward. Each tip of the second arm portions 98 is come into pressure contact with a second stopper 100 projecting from the module main body 51 in a state of being biased upward. From the above, the coil springs 95 bias the tip portion 81 of the flap 41 upward, namely toward a second spur 63 side.

A biasing force of the coil springs 95 is smaller than a weight of the recording paper 16. Thus, when the first surface 56 of the flap 41 supports the recording paper 16 being transported through the linear path 65B, the flap 41 changes its position from the second position to the first position by the weight of the recording paper 16. When the recording paper 16 supported on the flap 41 has passed through the flap 41, the flap 41 changes its position from the first position to the second position by a biasing force of the coil springs 95.

Incidentally, in this embodiment the coil springs 95 are used for biasing the flap 41, but another biasing member such as a leaf spring may also be used as long as it biases the flap 11.

<Detecting Portion 120>

As shown in FIG. 2 and FIG. 3, the printer portion 11 includes a detecting portion 120 for detecting the position of the flap 41.

The detecting portion 120 includes, for example, a turning body 121 to turn on a shaft 123, and a photosensor 122 such as a photointerrupter having a light-emitting element (for example, a light-emitting diode) and a light-receiving element receiving light emitted from light-emitting element (for example, a phototransistor). The shaft 123 of the turning body 121 is turnably attached to the flap 41. A tip portion of the tuning body 121 projects toward the reverse transporting path 67 from the flap 41.

Note that the turning body 121 projects outside a transporting region of the recording paper 16 in the reverse transporting path 67. In order to show the above fact, the turning body 121 is shown by a broken line in FIG. 2.

When the flap 41 is in a state of the second position, the tip of the turning body 121, as shown in FIG. 2, enters an optical path from the light-emitting element to the light-receiving element of the photosensor 122 to intercept light passing through the optical path. When the flap 41 changes its position to the first position, the tip of the turning body 121, as shown in FIG. 3, deviates from the optical path, and thereby light passes through the optical path.

<Control Portion 130>

Figure 9:
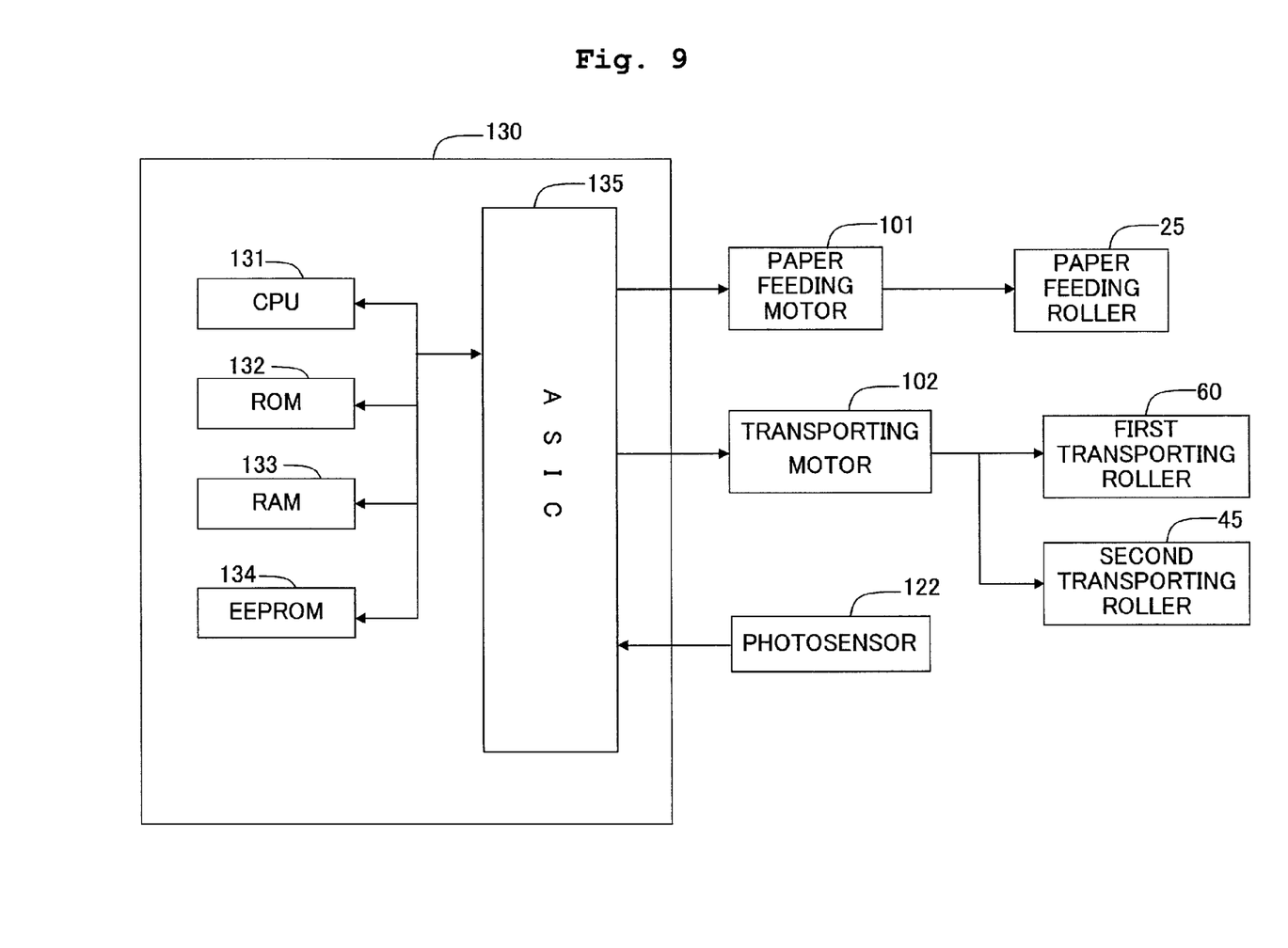
FIG. 9 is a block diagram showing a configuration of a control portion 130.

As shown in FIG. 9, a control portion 130 controls the whole operation of the multifunction apparatus 10, and includes: a CPU 131; a ROM 132; a RAM 133; an EEPROM 134; and an ASIC 135. These are connected by an internal bus 137.

In the ROM 132, programs and the like required for the CPU 131 to control various operations are stored. The RAM 133 is used as a memory area in which data, signals, and the like used when the CPU 131 executes the above-described programs are temporarily recorded, or as a working area of data processing. In the EEPROM 134, settings that should be maintained even after a power supply is tuned off, flags, and the like are stored.

To drive circuits provided in the ASIC 135, the paper feeding motor 101 and the transporting motor 102 are connected. When a drive signal for driving each of the motors is input to the drive circuit corresponding to the predetermined motor from the CPU 131, a drive current corresponding to the drive signal is output to the corresponding motor from the drive circuit. Thereby, the corresponding motor forwardly rotates or reversely rotates at a predetermined rotation speed.

Further, the photosensor 122 is connected to the ASIC 135. Thereby, for example, in this embodiment, a low-level signal is input to the ASIC 135 when the flap 41 is in the second position, and a high-level signal is input to the ASIC 135 when the flap 41 is in the first position. The CPU 131 judges the current position of the flap 41 based on the signal input to the ASIC 135 from the photosensor 122.

Hereinafter, the position change of the flap 41 and reverse processing of the second transporting motor 45 by the control portion 130 will be explained. Incidentally, as shown in FIG. 2 and FIG. 5A and FIG. 5B, the flap 41 maintains the second position by a biasing force of the coil springs 95 in the initial state. Thereby, a low-level signal is input to the control portion 130 from the photosensor 122, and the control portion 130 judges that the flap 41 is in the second position.

When an operation panel 12 (refer to FIG. 1) is operated and thereby double-sided printing is directed, the control portion 130 forwardly rotates the paper feeding motor 101 and the transporting motor 102. Then, the paper feeding roller 25, the first transporting roller 60, and the second transporting roller 45 forwardly rotate. Thereby, the recording paper 16 placed on the paper feeding tray 20 is transported in the first transporting direction 80 along the transporting path 65.

The recording paper 16 transported by the paper feeding roller 25 is sandwiched by the transporting roller pair 70. After this, the recording paper 16 is transported by the transporting roller pair 70. Thereafter, the recording paper 16 arrives just below the recording portion 24. At this time, the front surface of the recording paper 16 faces the recording portion 24. The recording portion 24 records an image on the front surface of the recording paper 16.

Thereafter, the transported recording paper 16 is supported on the first surface 56 of the flap 41. Then, the flap 41 changes its position from the second position to the first position by the weight of the recording paper 16. Thereby, a high-level signal is input to the control portion 130 from the photosensor 122, and the control portion 130 judges that the flap 41 has changed its position to the first position. Further, the recording paper 16, while being sandwiched by the flap 41 and the second spur 63, is further transported to the downstream side in the first transporting direction 80. Thereafter, the recording paper 16 is sandwiched by the discharge roller pair 44. After this, the recording paper 16 is transported by the discharge roller pair 44. Particularly, the recording paper 16 is further transported to the downstream side in the first transporting direction 80 by the discharge roller pair 44.

When the rear end of the recording paper 16 has passed through the flap 41, the flap 41 changes its position again from the first position to the second position by a biasing force of the coil springs 95. Thereby, a low-level signal is input to the control portion 130 from the photosensor 122, and the control portion 130 judges that the flap 41 has changed its position to the second position. The control portion 130 that has made such a judgment reversely rotates the transporting motor 102. Thereby, the paper feeding roller 25 and the first transporting roller 60 maintain the forward rotation, but the rotation direction of the second transporting roller 45 changes from the forward rotation to the reverse rotation. Consequently, the recording paper 16 sandwiched by the discharge roller pair 44 is transported in the direction reverse to the first transporting direction 80. At this time, the linear path 65B is blocked by the flap 41, so that the recording paper 16 is transported through the reverse transporting path 67 while being guided by the second surface 57 of the flap 41.

From the above, the control portion 130 switches the driving force being provided to the second transporting roller 45 by the transporting motor 102 from one of the forward rotation and the reverse rotation (the forward rotation in this embodiment) to the other (the reverse rotation in this embodiment) based on a condition that the detecting part 120 detects that the flap 41 has changed its position from the first position to the second position.

The recording paper 16 transported through the reverse transporting path 67 is sandwiched again by the transporting roller pair 70 through the connecting position 37. After this, the recording paper 16 is transported by the transporting roller pair 70. Thereafter, the recording paper 16 transported by the transporting roller pair 70 arrives just below the recording portion 24 again. At this time, the rear surface of the recording paper 16 faces the recording portion 24. The recording portion 24 records an image on the rear surface of the recording paper 16. Thereby, images are recorded on both the surfaces of the recording paper 16. Thereafter, the recording paper 16 is discharged to the paper feeding tray 20 through the discharge roller pair 44.

<Effects of this Embodiment>

As described above, in this embodiment, it is possible to record images on both the surfaces of the recording paper 16. Here, the flap 41 is disposed in order to make the double-sided image recording possible. Then, the tip portion 81 of the flap 41 is biased toward the second spur 63 side by the coil springs 95. The recording paper 16 guided through the linear path 65B in the first transporting direction 80 abuts or contacts on the first surface 56 of the flap 41. Thereby the flap 41 is pressed downward by the weight of the recording paper 16 and changes its position from the second position to the first position. In the above state, the recording paper 16, while being supported on the first surface 56, is transported in the first transporting direction 80 and reaches the position of the second spur 63. Consequently the recording paper 16 is brought into a state of being sandwiched by the second spur 63 and the flap 41. In the above state, to the sandwiched portion of the recording paper 16, an upward force is provided by the coil springs 95.

Further, the first spur 52 is provided on the upstream side from the second spur 63 which is capable of sandwiching the recording paper 16 with the tip portion 81 of the flap 41 in the first transporting direction 80. The first spur 52 abuts on the recording paper 16 from above. Then, the lower end of the second spur 63 is higher than that of the first spur 52. Accordingly, (i) the recording paper 16 is brought into a state of being inclined upward with respect to the first transporting direction 80 on the downstream side from the platen 42 in the first transporting direction 80. Further, (ii) as described above, the recording paper 16 has an upward force provided thereto by the coil springs 95 at the most downstream position of the inclination, namely at the sandwiching position by the second spur 63 and the flap 41. According to (i) and (iii) described above, the recording paper 16 is pressed against the platen 42. This makes it possible to decrease deterioration of quality of images recorded by the recording paper 16.

Further, in this embodiment, the first surface 56 is a plane, thereby making it easier for the recording paper 16 to be transported along the first surface 56.

Further, in this embodiment, the recording paper 16 is transported along the inclined surface 53 of the upper surface 17 of the module main body 51 as long as the recording paper 16 is not pulled by the discharge roller pair 44. Thereby, the recording paper 16 is brought into a state of being inclined on the downstream side of the platen 42. Consequently, it is possible to press the recording paper 16 against the platen 42.

When the flap 41 supports the recording paper 16 on the first surface 56, the flap 41 takes the first position by the weight of the recording paper 16. Further, when the flap 41 does not support the recording paper 16, the flap 41 is biased by the coil springs 95 to take the second position. In this embodiment, the flap 41 is provided over the range where the recording paper 16 to be transported through the linear path 65B is positioned, in a width direction of the linear path 65B (right and left direction 9). Thereby, even though, for example, the recording paper 16 is skewing, the flap 41 does not change its position from the first position to the second position until the recording paper 16 completely passes through the flap 41. From the above, according to this embodiment, it is possible to accurately detect that the recording paper 16 has passed through the flap 41, and it is possible to quickly switch the transporting of the recording paper 16 from the transporting path 65 to the reverse transporting path 67.

Further, according to this embodiment, it is possible to securely block the linear path 65B by the flap 41 between the second transporting roller 45 and the first spur 52. Thereby, it is possible to prevent the recording paper 16 having passed through the flap 41 from being reversely transported to the linear path 65B on the upstream side from the flap 41.

First Modified Embodiment

Figure 10A:
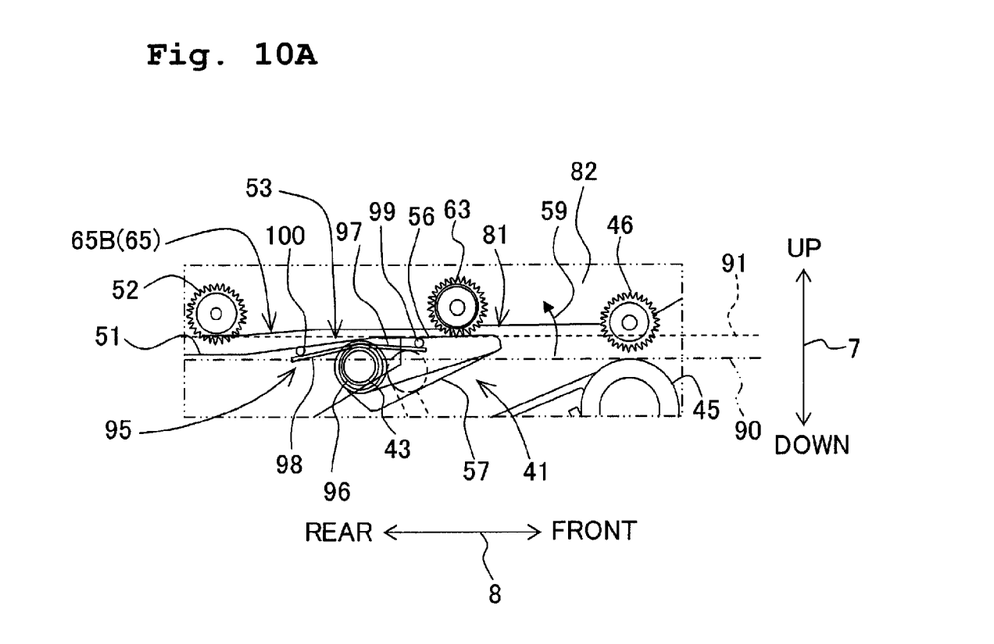

In the above-described embodiment, as shown in FIG. 3, the height 91 of the lower end of the second spur 63 is positioned at substantially the same height as the end, of the second transporting roller 45, abutting on the recording paper 16. However, as shown in FIG. 10A, a height 90 of the end, of the second transporting roller 45, abutting on the recording paper 16 may also be lower than the height 91 of the lower end of the second spur 63.

In a state where the tip of the recording paper 16 transported in the first transporting direction 80 is supported on the first surface 56 and is not transported by the second transporting roller 45, the sheet is brought into a state as described in the effects of the above-described embodiment. That is, the portion, of the recording paper 16, just on the platen 42 is pressed against the platen 42. Further, the portion of the recording paper 16 on the downstream side from the platen 42 is inclined upward with respect to the first transporting direction 80. That is, in a side view, the recording paper 16 is brought into a state of being curved or bent on the downstream side of the platen 42.

In such a state, when the recording paper 16 is sandwiched by the discharge roller pair 44, the recording paper 16 is pulled in the first transporting direction 80 by the discharge roller pair 44. Thereby, the recording paper 16, in a side view, tries to transition from the state of being curved or bent to a state of being straightened. Consequently, there is caused a fear that the recording paper 16 is brought into a state of rising from the platen 42.

Then, in a first modified embodiment, the end of the second transporting roller 45 abutting on the recording paper 16 is positioned lower than the lower end of the second spur 63. Thereby, when the recording paper 16 is sandwiched by the discharge roller pair 44, the recording paper 16 is curved with its vertex at the lower end of the second spur 63 in a side view. That is, on the upstream side from the lower end of the second spur 63, the recording paper 16 is inclined so as to be downward as it is close to the platen 42. Consequently, it is possible to press the recording paper 16 against the platen 42.

Second Modified Embodiment

In the above-described embodiment, the flap 41 sandwiches the recording paper 16 with the second spur 63. However, as shown in FIG. 7A and FIG. 7B and FIG. 8A and FIG. 8B, the second spur 63 does not also have to be attached to the upper side guide member 82. In the above case, the tip portion 81 of the flap 41 sandwiches the recording paper 16 with a lower surface of the upper side guide member 82. Thus, in the second modification, the portion, of the upper side guide member 82, sandwiching the recording paper 16 with the tip portion 81 of the flap 41 corresponds to the sandwiching member of the present teaching.

Third Modified Embodiment

Figure 10B:
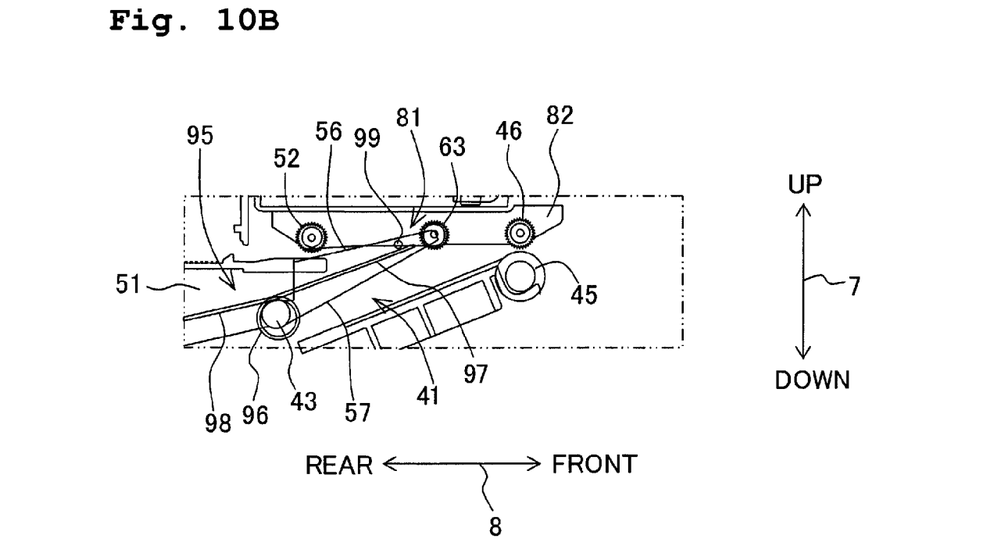

In the above-described embodiment, the shaft (projections 43) of the flap 41 is positioned on the downstream side from the spur 52 in the first transporting direction 80. However, as shown in FIG. 10B, the shaft (projections 43) of the flap 41 may also be positioned on the upstream side from the spur 52 in the first transporting direction 80. In the above case, the inclined surface 53 may be provided, or need not be provided. Note that in FIG. 10B, the structure without the inclined surface 53 is illustrated.

The above-described embodiment and the modified embodiments are merely examples of the present teaching, and the present teaching is not limited to them. An arbitrary change can be performed without departing from the spirit of the teaching. Further, the above-described embodiment and modified embodiments can be combined in an arbitrary aspect according to need.

What is claimed is:

1. An image recording apparatus which records an image on a sheet, comprising:
   a platen which is provided on a lower side of a first transporting path through which the sheet is guided along a transporting direction, and which supports the sheet guided through the first transporting path;
   a recording portion which is provided on an upper side of the first transporting path to face the platen, and which records the image on the sheet supported on the platen;
   a contacting member which is disposed on the upper side of the first transporting path at a downstream side from the recording portion in the transporting direction, and which is configured to contact on the sheet at a position that is lower than a lower surface of the recording portion and higher than an upper surface of the platen;
   a transporting roller which is disposed at the downstream side from the contacting member in the transporting direction to transport the sheet;
   a flap which is configured to turn on a shaft, of which a tip portion is positioned between the contacting member and the transporting roller in the transporting direction, and which includes a first surface and a second surface,
   a nipping member which is disposed on the upper side of the first transporting path and which is configured to nip the sheet between the nipping member and the first surface of the flap; and
   a biasing member which is configured to bias the flap toward a side of the nipping member,
   wherein the first surface of the flap forms a lower side guide surface of the first transporting path,
   the second surface of the flap forms an upper side guide surface of a second transporting path,
   the second transporting path is a transporting path which extends below the platen, through which the sheet is guided, and which is connected to the first transporting path between the contacting member and the transporting roller in the transporting direction, and an upstream side from the recording portion in the transporting direction,
   the flap is configured to turn to be in a first position in which the flap nips the sheet between the first surface of the flap and the nipping member to guide the sheet in the first transporting path, and in a second position in which the tip portion is positioned higher than the tip portion in the first position to block the first transporting path, and
   a lower end of the nipping member is positioned higher than a lower end of the contacting member.

2. The image recording apparatus according to claim 1, wherein a portion, of the transporting roller, contacting on the sheet is positioned lower than the lower end of the nipping member.

3. The image recording apparatus according to claim 1 further comprising: a particular guide member which is disposed on the lower side of the first transporting path between the platen and the first surface of the flap in the transporting direction, and which includes a third surface that forms the lower side guide surface of the first transporting path,
   wherein the flap is attached to the particular guide member at the downstream side in the transporting direction, and
   the third surface is an inclined surface of which downstream side in the transporting direction is positioned higher than upstream side of the third surface.

4. The image recording apparatus according to claim 1, wherein the flap is provided over at least a range where the sheet to be transported through the first transporting path is positioned, in a width direction of the first transporting path, the apparatus further comprise:
   a detecting portion which detects the position of the flap;
   a drive source which provides driving forces of forward rotation and reverse rotation to the transporting roller; and
   a control portion which is configured to switch the driving force provided to the transporting roller by the drive source from one of the forward rotation and the reverse rotation to the other, under a condition that the detecting portion detects that the flap has changed its position from the first position to the second position.

5. The image recording apparatus according to claim 1, wherein the nipping member is a spur roller,
   the apparatus further comprising a further guide member which is provided on the upper side of the first transporting path and on which the spur roller is disposed,
   wherein in the further guide member, a recessed portion is formed on a side of the first transporting path, and
   the tip portion of the flap in the second position is inserted into the recessed portion.

* * * * *